(12) United States Patent
Lian et al.

(10) Patent No.: US 12,546,815 B2
(45) Date of Patent: Feb. 10, 2026

(54) CHIP TESTING DEVICE AND PACKAGE TESTING MACHINE

(71) Applicant: SEMIGHT INSTRUMENTS CO., LTD, Suzhou (CN)

(72) Inventors: Zhe Lian, Suzhou (CN); Jianjun Huang, Suzhou (CN); Yonghong Wu, Suzhou (CN); Shan Zhao, Suzhou (CN); Haiyang Hu, Suzhou (CN)

(73) Assignee: SEMIGHT INSTRUMENTS CO., LTD, Suzhou (CN)

( * ) Notice: Subject to any disclaimer, the term of this patent is extended or adjusted under 35 U.S.C. 154(b) by 143 days.

(21) Appl. No.: 18/427,138

(22) Filed: Jan. 30, 2024

(65) Prior Publication Data
US 2024/0295600 A1  Sep. 5, 2024

Related U.S. Application Data

(63) Continuation of application No. PCT/CN2023/134142, filed on Nov. 24, 2023.

(30) Foreign Application Priority Data

Mar. 1, 2023  (CN) .......................... 202310186969.1

(51) Int. Cl.
*G01R 31/28* (2006.01)

(52) U.S. Cl.
CPC ..... *G01R 31/2874* (2013.01); *G01R 31/2856* (2013.01); *G01R 31/2863* (2013.01); *G01R 31/2867* (2013.01); *G01R 31/2868* (2013.01); *G01R 31/2896* (2013.01)

(58) Field of Classification Search
None
See application file for complete search history.

(56) References Cited

U.S. PATENT DOCUMENTS

| | | | | |
|---|---|---|---|---|
| 5,359,285 A * | 10/1994 | Hashinaga | ......... | G01R 31/2874 324/750.08 |
| 5,775,416 A * | 7/1998 | Heimanson | ............. | C23C 14/50 156/345.52 |
| 6,668,570 B2 * | 12/2003 | Wall | .................... | G01R 31/2874 62/211 |
| 6,825,681 B2 * | 11/2004 | Feder | ................. | G01R 31/2874 62/3.1 |
| 7,271,604 B2 * | 9/2007 | Reitinger | ........... | G01R 31/2874 324/754.03 |
| 8,653,843 B2 * | 2/2014 | Ando | ................. | G01R 31/2874 324/750.04 |

(Continued)

*Primary Examiner* — Richard Isla

(74) *Attorney, Agent, or Firm* — ANOVA LAW GROUP, PLLC

(57) ABSTRACT

Chip testing device and package testing machine are provided. The chip testing device includes an upper base and a lower base, the upper base being above the lower base and being pressed against the lower base, and a top of the lower base featuring a first mounting part for mounting a test chip and a second mounting part beneath the first mounting part; a first test probe, penetrating the upper base and contacts the test chip to obtain an electrical signal of the test chip; a heat sink base, at the second mounting part and contacting the test chip to transfer a received heat to the test chip; and a first temperature sensor in the heat sink base to measure an actual temperature of the test chip.

18 Claims, 8 Drawing Sheets

(56) References Cited

U.S. PATENT DOCUMENTS

| | | | | |
|---|---|---|---|---|
| 8,686,749 | B2* | 4/2014 | Erwin | G01R 31/2884 |
| | | | | 324/763.01 |
| 8,872,532 | B2* | 10/2014 | Breinlinger | G01R 1/0491 |
| | | | | 324/750.19 |
| 11,181,576 | B2* | 11/2021 | Kato | G01R 31/2891 |
| 11,573,266 | B2* | 2/2023 | Ohmart | H01L 23/345 |
| 12,474,398 | B2* | 11/2025 | Lee | G01R 31/2867 |
| 2011/0132000 | A1* | 6/2011 | Deane | F25B 21/04 |
| | | | | 62/3.3 |
| 2019/0162777 | A1* | 5/2019 | Chiang | G01R 31/2875 |
| 2021/0132140 | A1* | 5/2021 | Tsai | G11C 29/56 |

* cited by examiner

CHIP TESTING DEVICE AND PACKAGE TESTING MACHINE

CROSS-REFERENCE TO RELATED APPLICATION

This application is a continuation application of PCT Patent Application No. PCT/CN2023/134142, filed on Nov. 24, 2023, which claims priority to Chinese patent application No. 2023101869691, filed on Mar. 1, 2023, the entire contents of all of which are hereby incorporated by reference.

FIELD OF THE DISCLOSURE

The present disclosure generally relates to the field of chip testing technology and, more particularly, relates to a chip testing device and a package testing machine.

BACKGROUND

During a testing process of power semiconductor chips, since it is necessary to determine whether relevant indicators of a chip in a high-temperature working environment meet design requirements, the chip needs to be heated during the testing process to ensure that the chip completes a relevant power-on performance test within a specified constant temperature range. Since changes of chip temperature are positively correlated with a specific key test indicator, the power-on performance test of the chip is very easily affected by an actual temperature of the chip. Therefore, the entire testing process demands a high temperature stability, necessitating stringent accuracy requirements for temperature control components in a chip testing device.

In the existing technologies, although a heating function is added to the chip testing device the actual temperature of the chip cannot be accurately controlled, resulting in poor temperature stability, which will affect an accuracy of a chip power-on performance test.

BRIEF SUMMARY OF THE DISCLOSURE

One aspect of the present disclosure provides a chip testing device. The chip testing device includes an upper base and a lower base, the upper base being above the lower base and being pressed against the lower base, and a top of the lower base featuring a first mounting part for mounting a test chip and a second mounting part beneath the first mounting part; a first test probe, penetrating the upper base and contacts the test chip to obtain an electrical signal of the test chip; a heat sink base, at the second mounting part and contacting the test chip to transfer a received heat to the test chip; and a first temperature sensor in the heat sink base to measure an actual temperature of the test chip.

Another aspect of the present disclosure provides a package testing machine. The package testing machine includes a die loading apparatus, for automatically picking up dies from a tape reel and adapting to dies of different sizes in a die automatic loading area; a high-speed linear motor, for ensuring die handling speed and stability and a nozzle transportation apparatus for chips, containing six sets of nozzle mover handling structures in a die handling area; an unloading station, equipped with a material (die) box in-situ detection system to prevent unloading failure or abnormalities and a large-field CCD, mounted at the unloading station in a die unloading area; and a chip testing device, for ensuring accuracy of a power-on performance test by precisely monitoring an actual temperature of a test chip, and a plurality of stations, for supporting multi-station parallel testing and serial testing, and different test projects in a die test area. The chip testing device includes an upper base and a lower base, the upper base being above the lower base and being pressed against the lower base, and a top of the lower base featuring a first mounting part for mounting a test chip and a second mounting part beneath the first mounting part; a first test probe, penetrating the upper base and contacts the test chip to obtain an electrical signal of the test chip; a heat sink base, at the second mounting part and contacting the test chip to transfer a received heat to the test chip; and a first temperature sensor in the heat sink base to measure an actual temperature of the test chip.

Other aspects of the present disclosure can be understood by a person skilled in the art in light of the description, the claims, and the drawings of the present disclosure.

BRIEF DESCRIPTION OF THE DRAWINGS

Specific embodiments of the present disclosure will be described in detail below by way of illustration and not limitation with reference to accompanying drawings. Same reference numbers in the accompanying drawings identify same or similar parts or portions. A person skilled in the art should understand that the accompanying drawings are not necessarily drawn to scale.

Figure 1:
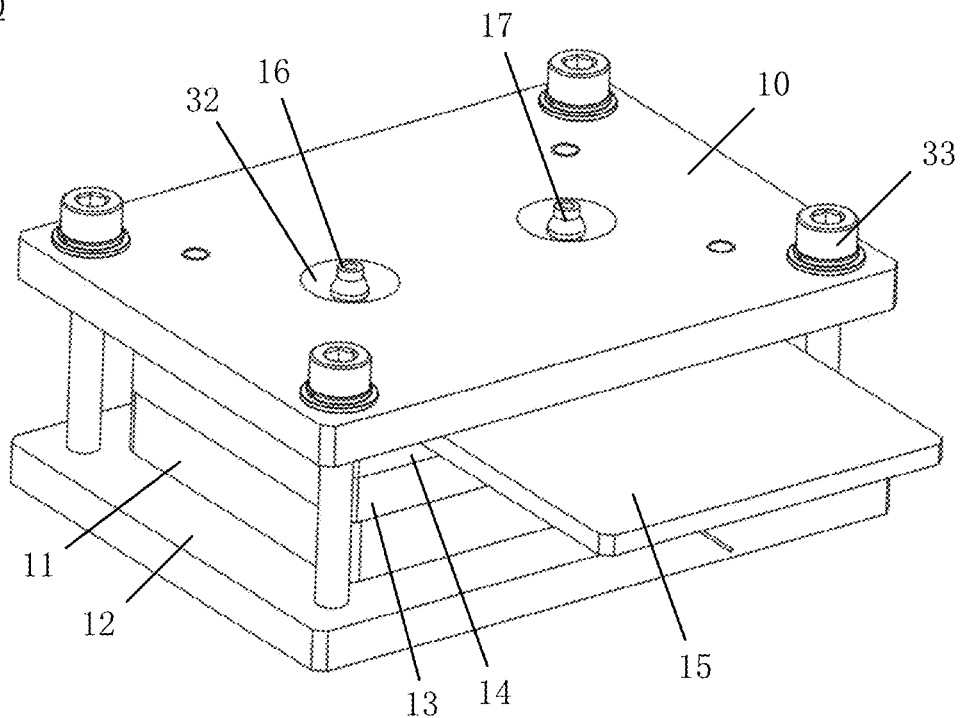
FIG. 1 illustrates a schematic diagram of a chip testing device provided by one embodiment of the present disclosure.

Reference numeral list: 100—chip testing device, 10—upper cover plate, 11—thermal isolation base, 12—lower cover plate, 13—lower base, 14—upper base, 15—PCB board, 16—first air pipe joint, 17—second air pipe joint, 18—first test probe, 19—test chip, 20—second test probe, 21—heat sink base, 22—conductive sheet, 23—first wire, 24—second wire, 25—second temperature sensor, 26—heating component, 27—first temperature sensor, 28—third mounting part, 29—second elastic member, 30—first elastic member, 31—sealant, 32—escape hole, 33—bolt, 111—sixth mounting part, 112—fifth mounting part, 131—first mounting slot, 132—first mounting part, 133—fourth mounting part, 134—second mounting part, 135—second mounting slot, 141—first through hole, 142—second through hole, 212—seventh mounting part, 211—mounting cavity, 221—extension part, 222—body, 41—die automatic loading area, 42—die handling area, 43—die test area, 44—die unloading area, 45—upper socket, and 46—lower socket.

DETAILED DESCRIPTION

Figure 2:
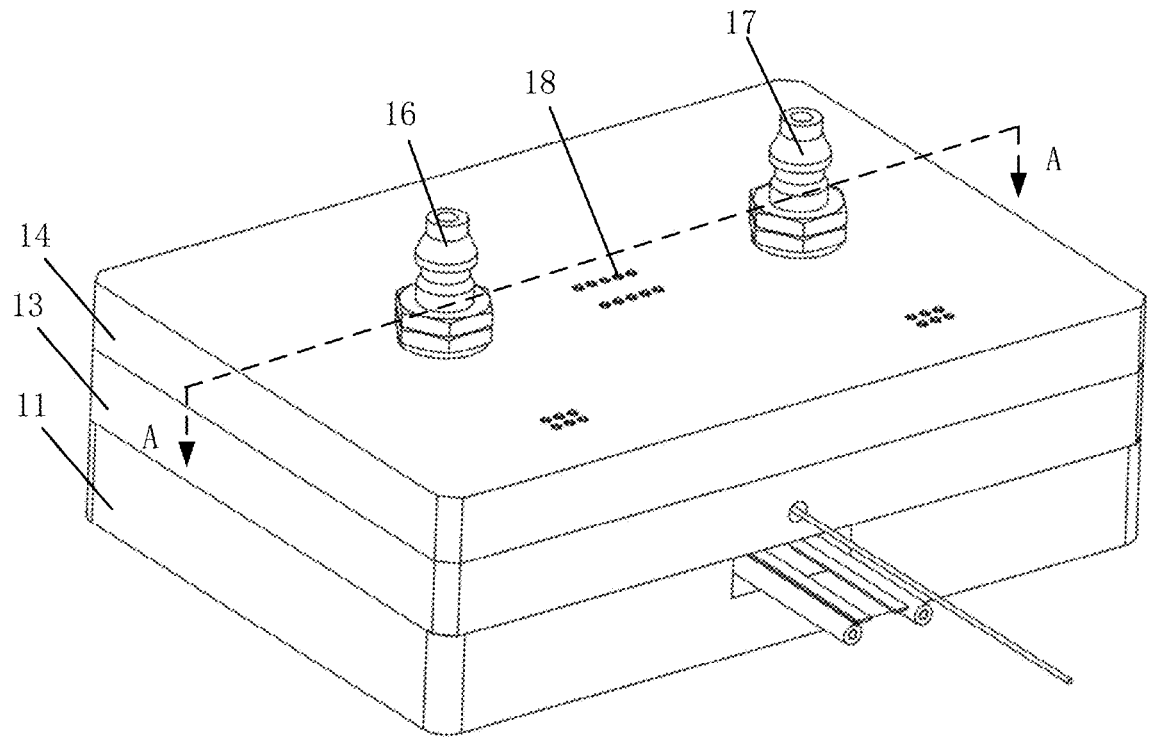
FIG. 2 illustrates an installation diagram of an upper cover plate, a lower cover plate and a thermal isolation base in the chip testing device shown in FIG. 1.
Figure 3:
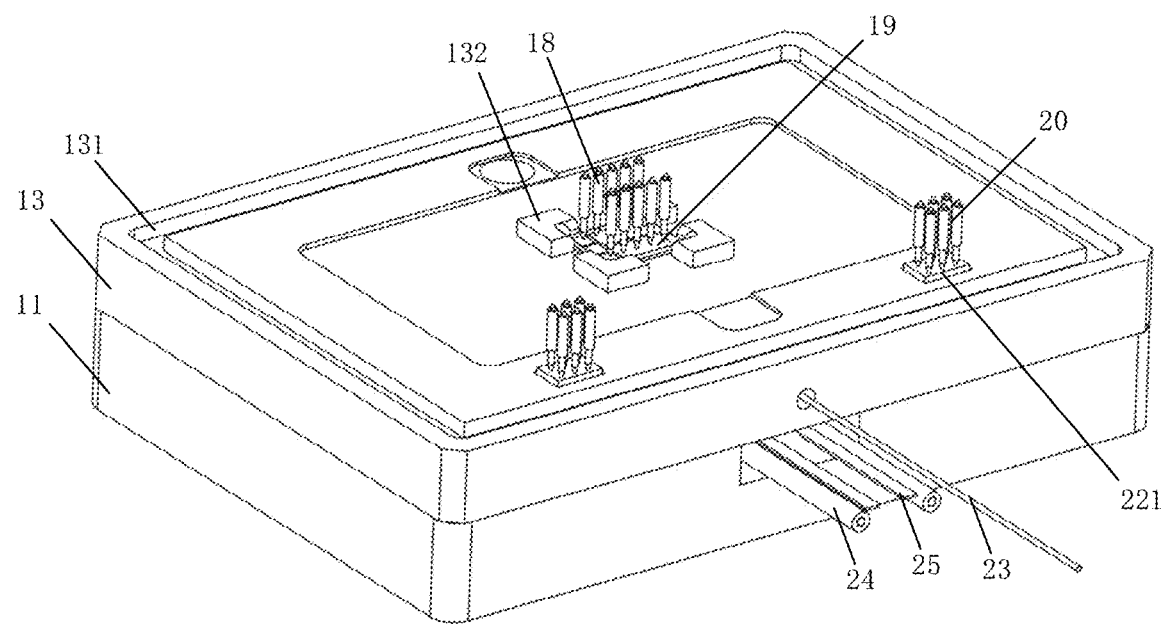
FIG. 3 illustrates an installation diagram of a test chip in the chip testing device shown in FIG. 1.
Figure 4:
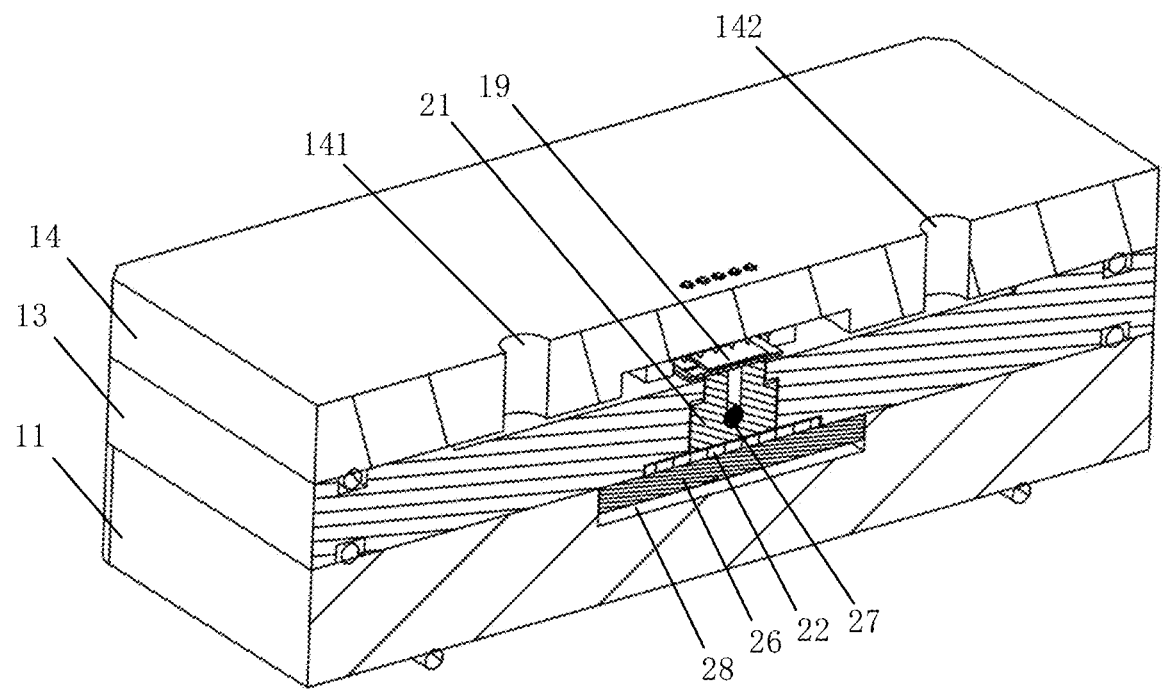
FIG. 4 illustrates a cross-sectional view of FIG. 2 along a section line A-A.
Figure 5:
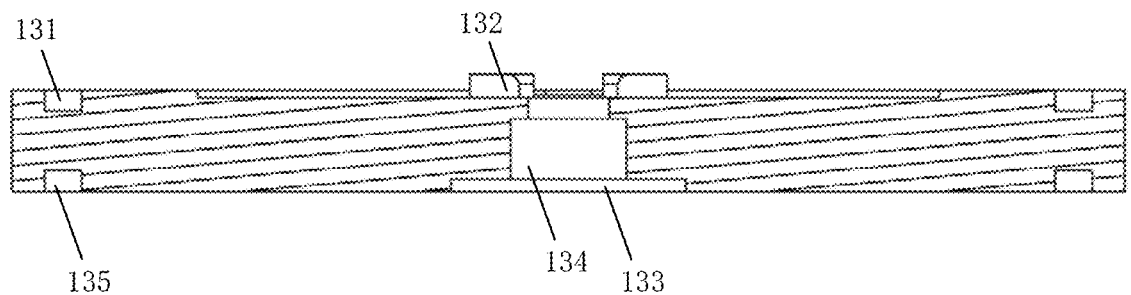
FIG. 5 illustrates a cross-sectional view of a lower base of the chip testing device shown in FIG. 1.

FIG. 1 illustrates a schematic diagram of a chip testing device provided by one embodiment of the present disclosure. FIG. 2 illustrates an installation diagram of an upper cover plate, a lower cover plate and a thermal isolation base in the chip testing device shown in FIG. 1. FIG. 3 illustrates an installation diagram of a test chip in the chip testing device shown in FIG. 1. FIG. 4 illustrates a cross-sectional view of FIG. 2 along a section line A-A. FIG. 5 illustrates a cross-sectional view of a lower base of the chip testing device shown in FIG. 1. As shown in FIGS. 1-5, in one specific embodiment, the chip testing device 100 for testing a test chip 19 includes an upper base 14 and a lower base 13. The upper base 14 is located above the lower base 13 and is pressed against the lower base 13. A top of the lower base 13 features a first mounting part 132 for mounting the test chip 19 and a second mounting part 134 located below the first mounting part 132. The chip testing device 100 further includes a first test probe 18, a heat sink base 21 and a first temperature sensor 27. The first test probe 18 penetrates the upper base 14 and contacts the test chip 19 to obtain an electrical signal of the test chip 19. The heat sink base 21 is arranged on the second mounting part 134 and contacts the test chip 19 to transfer a received heat to the test chip 19. The first temperature sensor 27 is arranged inside the heat sink base 21 to measure an actual temperature of the test chip 19.

In one embodiment, the first temperature sensor 27 is inserted into the heat sink base 21 to directly measure a temperature beneath the test chip 19 to ensure consistency between the temperature of the test chip 19 and a temperature at a measurement point. An actual measured temperature difference between the heat sink base 21 and the test chip 19 is measured to be less than 0.2°, so that the actual temperature of the test chip 19 can be precisely monitored to prevent any impact on an accuracy of a power-on performance test of the test chip 19.

In one embodiment, the first mounting part 132 is formed by the lower base 13 protruding toward the top of the lower base 13, and the first mounting part 132 is composed of four parts. The four parts form a right-angle shape and jointly define a square installation space to mount the test chip 19 in the installation space and confine a position of the test chip 19. In other embodiments, a shape of the first mounting part 132 can also be arranged according to specific design requirements.

In one embodiment, the first temperature sensor 27 utilizes a specially processed miniature thermocouple temperature probe, which resolves a high voltage withstand problem in small-sized sensors, meets insulation design requirements for high-voltage testing, ensures rapid heat conduction efficiency, reduces thermal hysteresis in heat transfer, improves a temperature consistency of the heat sink base 21, and minimizes temperature fluctuation during a test process of the test chip 19.

Figure 6:
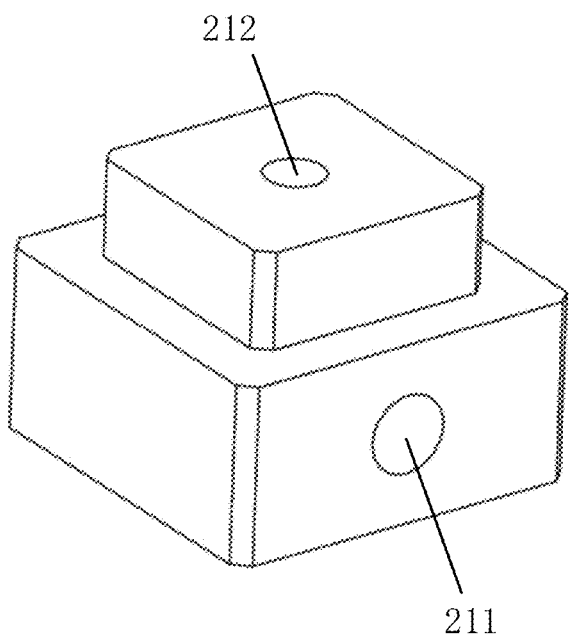
FIG. 6 illustrates a schematic diagram of a heat sink base in the chip testing device shown in FIG. 1.

FIG. 6 illustrates a schematic diagram of a heat sink base in the chip testing device shown in FIG. 1. As shown in FIG. 6 and referring to FIGS. 1-5, a seventh mounting part 212 is arranged inside the heat sink base 21. The seventh mounting part 212 is configured to mount an adsorption component to adsorb the test chip 19. Specifically, the heat sink base 21 includes a first part and a second part arranged vertically, the first part is smaller in size than the second part. A mounting cavity 211 for mounting the first temperature sensor 27 is arranged in the second part. The first temperature sensor 27 is connected to a thermostat through a first wire 23. The first part is arranged with a seventh mounting part 212 for mounting the adsorption component. The seventh mounting part 212 extends vertically, while the mounting cavity 211 extends horizontally. If automatic testing of the test chip 19 is necessary, only the adsorption component needs to be installed in the seventh mounting part 212. If automatic testing of the test chip 19 is not required, that is, if the test chip 19 is manually mounted to the first mounting part 132, there is no need to mount the adsorption component in the seventh mounting part 212. In the embodiment, the designed heat sink base 21 can meet requirements for both automatic and manual testing of the test chip 19, and the adsorption component can be a suction cup. In addition, a shape of the second mounting part 134 can be specifically designed according to an outer shape of the heat sink base 21.

In one embodiment, the chip testing device 100 further includes an upper cover plate 10 and a lower cover plate 12. The upper cover plate 10 is arranged above the upper base 14, and the lower cover plate 12 is arranged below the lower base 13. Both the upper cover plate 10 and the lower cover plate 12 are square. The upper cover plate 10 and the lower cover plate 12 are connected by four bolts 33, each arranged at a right angle to corresponding sides of the upper cover plate 10 and the lower cover plate 12.

In one embodiment, the chip testing device 100 further includes a PCB board 15 arranged between the upper cover plate 10 and the upper base 14. The PCB board 15 contacts the first test probe 18, extends along an exterior of the chip testing device 100, and is connected to a package testing machine to transmit an electrical signal acquired by the first test probe 18 for testing the test chip 19. In other embodiments, the first test probe 18 can also be connected to the package testing machine by wire bonding.

In one embodiment, the chip testing device 100 further includes a thermal isolation base 11 and a heating component 26. The thermal isolation base 11 is arranged beneath the lower base 13 and contacts the lower base 13. A third mounting part 28 is arranged on top of the thermal isolation base 11. The heating component 26 is arranged beneath the heat sink base 21 and at the third mounting part 28 to heat the heat sink base 21. In the embodiment, the heating component 26 is configured to generate heat. The heating component 26 transfers heat to the heat sink base 21, and the heat sink base 21 transfers the heat to the test chip 19, thereby heating the test chip 19. In the embodiment, the test chip 19 is heated through thermal conduction to meet heating test requirements of the test chip 19. A leakage current throughout an entire heating process is less than 0.02 uA/3000 V at 175° C.

In one embodiment, the lower base 13 further includes a fourth mounting part 133 beneath the second mounting part 134. The chip testing device 100 also includes a conductive sheet 22 arranged at the fourth mounting part 133. A top of the conductive sheet 22 contacts the heat sink base 21, while a bottom of the conductive sheet 22 contacts the heating component 26 to transfer heat generated by the heating component 26 to the heat sink base 21. The conductive sheet 22 is arranged between the heating component 26 and the heat sink base 21. Heat generated by the heating component 26 is transferred to the conductive sheet 22, the conductive sheet 22 transfers the heat to the heat sink base 21, and the heat sink base 21 transfers the heat to the test chip 19, thereby heating the test chip 19.

Figure 7:
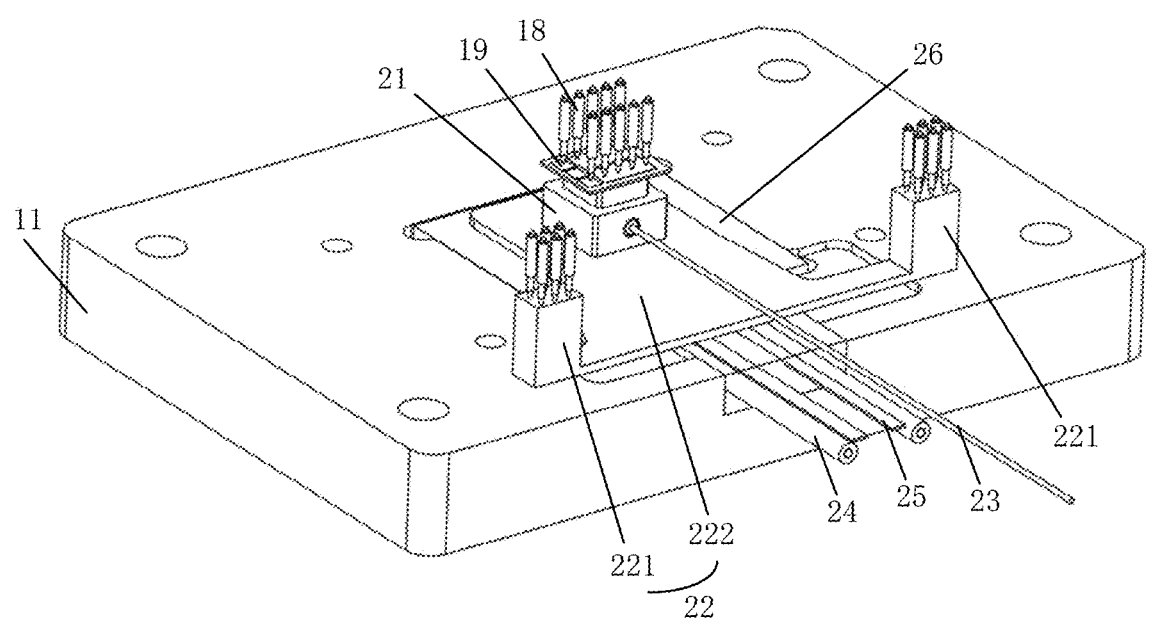
FIG. 7 illustrates an installation diagram of the heat sink base, a conductive sheet and a heating components in the chip testing device shown in FIG. 1.

FIG. 7 illustrates an installation diagram of the heat sink base 21, the conductive sheet 22 and the heating component 20 in the chip testing device 100 shown in FIG. 1. As shown in FIG. 7, in one embodiment, the conductive sheet 22 includes a body 222 and an extension part 221 extending upward from the body 222 to reach above the lower base 13. The chip testing device 100 further includes a second test probe 20 that penetrates the upper base 14 and contacts the extension part 221 to obtain an electrical signal from the test chip 19. The extension part 221 of the conductive sheet 22 extends from a bottom of the lower base 13 to a top of the lower base 13 to contact the second test probe 20. The second test probe 20 contacts the PCB board 15 to transmit the electrical signal from the test chip 19 to the package testing machine through the PCB board 15 to test the test chip 19. The first test probe 18 tests an electrical signal above the test chip 19, while the second test probe 20 tests an electrical signal beneath the test chip 19. In one embodiment, number of extension parts 221 is two, and both two extension parts 221 have corresponding second test probes 20 in contact with the two extension parts 221.

In one embodiment, the heating component 26 is a ceramic heating piece. The embodiment uses a customized small ceramic heating piece to solve a problem of a size of the heating component 26 on a small chip. Moreover, no exposed heating wire is exposed to the air, which prevents a core heating wire from oxidation failure when exposed to the air, greatly improves a service life of the heating component 26 of the chip testing device 100 and meets the withstand voltage requirements of the high-voltage test of the test chip 19. The heating component 26 is connected to the thermostat through two second wires 24.

Figure 8:
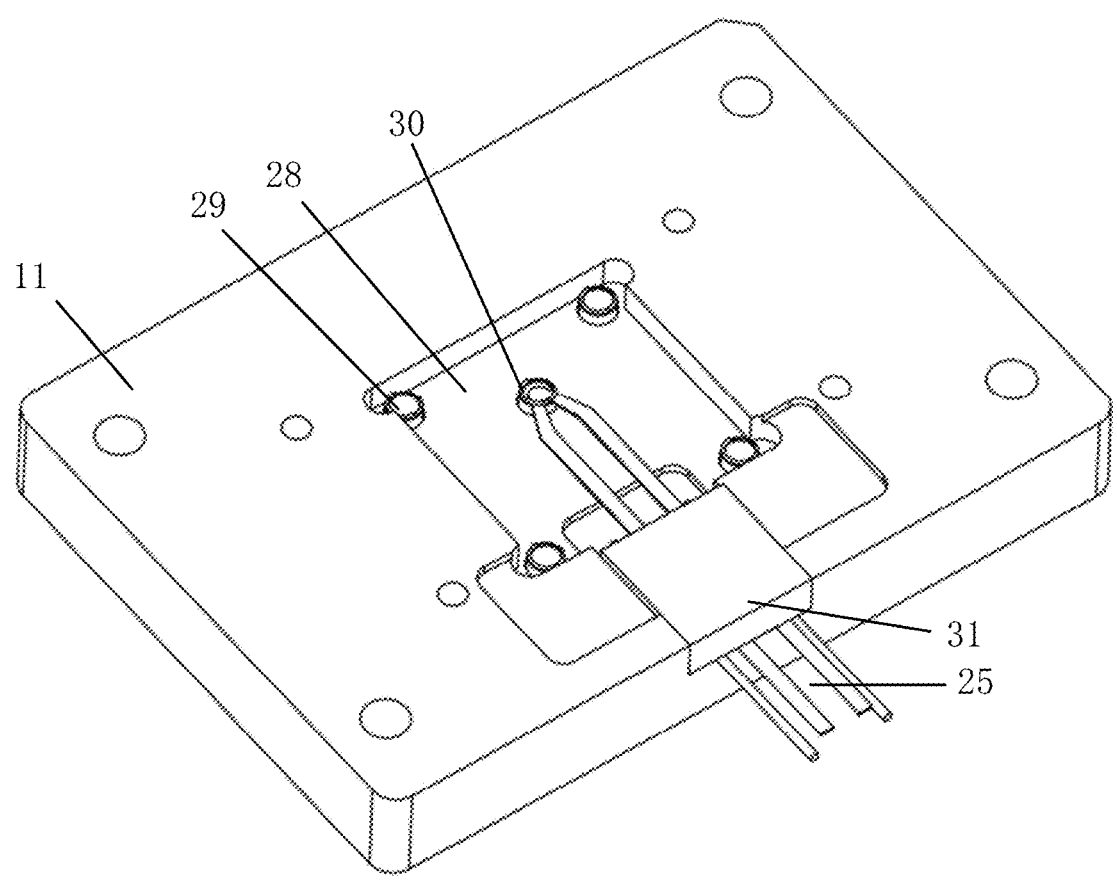
FIG. 8 illustrates an installation diagram of the thermal isolation base, a first elastic part and a second elastic part in the chip testing device shown in FIG. 1.
Figure 9:
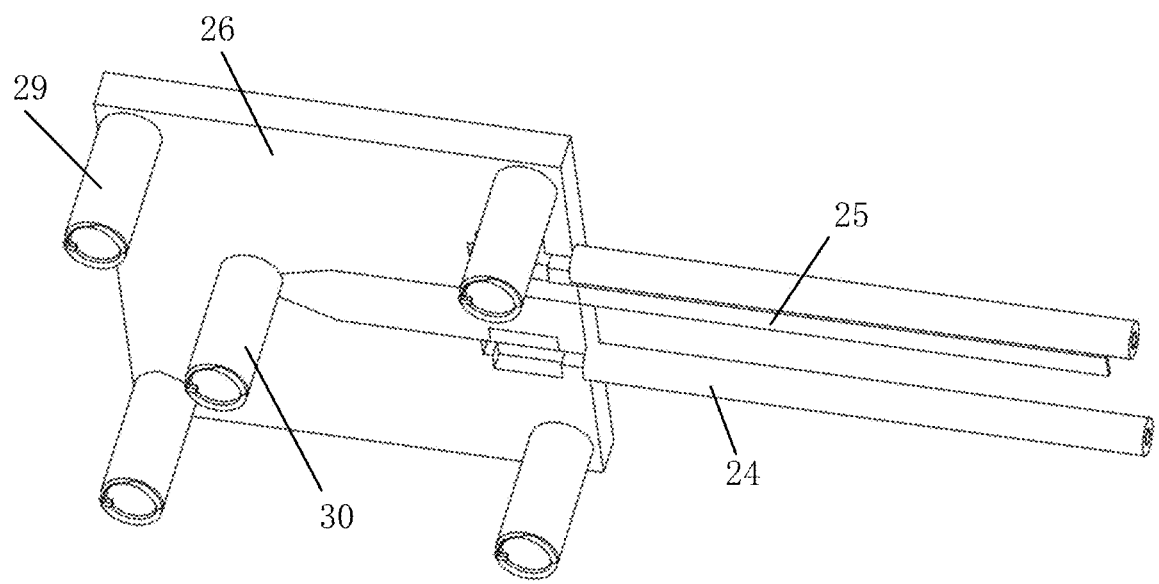
FIG. 9 illustrates an installation diagram of the heating component, the first elastic member, and the second elastic member in the chip testing device shown in FIG. 1.
Figure 10:
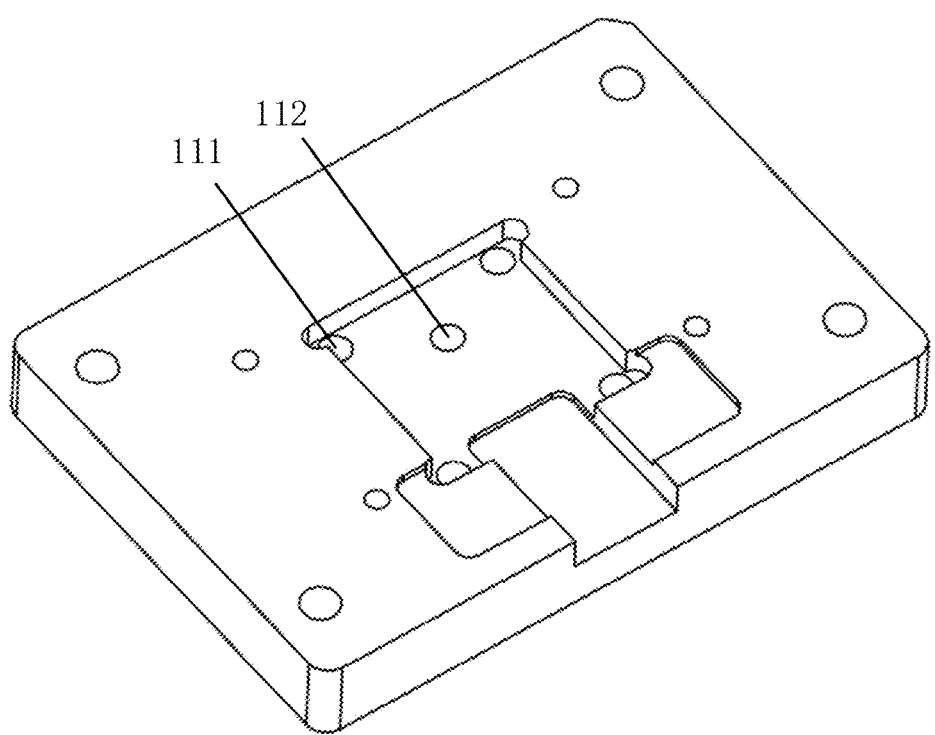
FIG. 10 illustrates a schematic diagram of the thermal isolation base in the chip testing device shown in FIG. 1.

FIG. 8 illustrates an installation diagram of the thermal isolation base 11 and the first elastic member 30 and the second elastic member 29 in the chip testing device 100 shown in FIG. 1. FIG. 9 illustrates an installation diagram of the heating component 26, the first elastic member 30, and the second elastic member 29 in the test device shown in FIG. 1. FIG. 10 illustrates a schematic diagram of the thermal isolation base 11 in the chip testing device 100 shown in FIG. 1. As shown in FIGS. 8-9, in one embodiment, the testing device 100 further includes a second temperature sensor 25, which is arranged at the heating component 26 to measure a temperature of the heating component 26. The second temperature sensor 25 is connected to the thermostat. The second temperature sensor 25 is a small-sized surface temperature probe that ensures an overheat protection of the entire chip testing device 100, prevents the heating component 26 from overheating and burning under extreme abnormal conditions, thereby eliminating fire hazards. In the embodiment, the first temperature sensor 27 and the second temperature sensor 25 perform high-speed temperature sampling, while an output of the sampling is controlled by a temperature controller and supplemented by a PID artificial intelligence fuzzy control algorithm to achieve rapid temperature control of the entire chip testing device 100, ultimately ensuring high accuracy and high responsiveness of the temperature of the entire chip testing device 100.

In one embodiment, the second temperature sensor 25 is arranged at a bottom of the heating component 26 and contacts the heating component 26. In other embodiments, a design position of the second temperature sensor 25 can also be arranged according to specific design requirements.

In one preferred embodiment, the thermal isolation base 11 has a fifth mounting part 112 beneath the third mounting part 28. The chip testing device 100 includes a first elastic member 30 arranged inside the fifth mounting part 112. A top of the first elastic member 30 contacts the second temperature sensor 25 so that the second temperature sensor 25 also contacts the heating component 26. The embodiment incorporates an elastic member floating design beneath the heating component 26 to ensure that once both the heating component 26 and the second temperature sensor 25 are mounted, the heating component 26 is in full contact with the second temperature sensor 25 to ensure a precise monitoring of an actual temperature of the heating component 26. The first elastic member 30 contacts a top of the second temperature sensor 25, so that the head of the second temperature sensor 25 is in full contact with the heating component 26. The first elastic member 30 is a spring, and the fifth mounting part 112 is a through hole arranged on the thermal isolation base 11. A bottom of the first elastic member 30 contacts the lower cover plate 12. In other embodiments, the first elastic member 30 may also be made of other elastic components. In other embodiments, the fifth mounting part 112 may also be a mounting slot arranged on the thermal isolation base 11, and the bottom of the first elastic member 30 contacts the bottom of the mounting slot.

In one embodiment, the thermal isolation base 11 includes a sixth mounting part 111 beneath the third mounting part 28. The chip testing device 100 further includes a second elastic member 29 arranged inside the sixth mounting part 111. A top of the second elastic member 29 contacts a bottom of the heating component 26. The embodiment incorporates an elastic member floating design beneath the heating component 26 to ensure that once the heating component 26 is mounted, the heating component 26 is in full contact with the conductive sheet 22 and the conductive sheet 22 is in full contact with the heat sink base 21 to ensure rapid heat conduction throughout the heating process, thereby increasing a heating rate of the test chip 19. There are four second elastic members 29 respectively in contact with the four corners of the heating component 26, so that the entire heating component 26 is in full contact with the conductive sheet 22. The second elastic member 29 is a spring, and the sixth mounting part 111 is a through hole arranged on the thermal isolation base 11. A bottom of the second elastic member 29 is in contact with the lower cover plate 12. In other embodiments, the second elastic member 29 may also be made of other elastic components. In other embodiments, the sixth mounting part 111 may also be a mounting slot arranged on the thermal isolation base 11, and the bottom of the second elastic member 29 is in contact with a bottom of the mounting slot.

In one preferred embodiment, thermal conduction materials are coated between the heating component 26 and the conductive sheet 22 and between the conductive sheet 22 and the heat sink base 21. The coating further improves heat transfer rates among the heating component 26, the conductive sheet 22 and the heat sink base 21.

In one embodiment, the chip testing device 100 further includes a first air pipe joint 16 and a second air pipe joint 17. A test chamber is defined between the upper base 14 and the lower base 13 and the test chip 19 is in the test chamber. The first air pipe joint 16 is configured to fill the test chamber with protective gas at a preset pressure to meet high voltage test conditions of the test chip 19 and prevent abnormal high-voltage spark discharge during a test process. The entire chip testing device 100 is designed to meet high-voltage test requirements of 3000V. The second air pipe joint 17 is arranged with a pressure sensor to measure a pressure in the test chamber to acquire a pressure signal in the test chamber to monitor a pressure in the test chamber. Specifically, the upper base 14 is configured with a first through hole 141 and a second through hole 142, both of which are directly connected to the test chamber. The first air pipe joint 16 is arranged in the first through hole 141, and the second air pipe joint 17 is arranged in the second through hole 142. In addition, the upper cover plate 10 is provided with two escape holes 32 corresponding to the first air pipe joint 16 and the second air pipe joint 17 to allow a release of gas from the two air pipe joints without collision.

In one embodiment, a top of the lower base 13 is arranged with a first mounting slot 131, and the bottom of the lower base 13 is arranged with a second mounting slot 135. The chip testing device 100 also includes a first sealing ring and a second sealing ring respectively arranged in the first mounting slot 131 and the second mounting slot 135 to respectively seal the upper base 14 and the lower base 13 and seal the lower base 13 and the thermal isolation base 11. In addition, a third mounting slot is arranged on top of the lower cover plate 12. The chip testing device 100 further includes a third sealing ring arranged in the third mounting slot to seal the lower cover plate 12 and the thermal isolation base 11. In the embodiment, designing a special airtight structure and filling the test chamber with protective gas at a high pressure can ensure compliance with high-temperature anti-oxidation functional requirements and high-pressure anti-ignition/breakdown functional requirements of the test chip 19, and can monitor the test pressure in the test chamber and an airtight performance of the chip testing device 100.

In one embodiment, after the second wires 24 and the second temperature sensor 25 are mounted, a sealant 31 is filled around the second wire 24 and the second temperature sensor 25 to seal the thermal isolation base 11 and improve a sealing performance of the thermal isolation base 11.

In one embodiment, after the test chip 19 is placed into the first mounting part 132 of the lower base 13, the test chip 19 is directly pressed on the heat sink base 21 through the upper base 14 and the upper cover plate 10 to ensures that a bottom of the test chip 19 is in full contact with the heat sink base 21 by the first test probe 18. Since a temperature of the chip testing device 100 is controlled by heat conduction, the chip testing device 100 exhibits highest heat conduction efficiency, highest temperature accuracy and highest response speed, laying a foundation for subsequent high-speed testing of the package testing machine. A control temperature range of the entire chip testing device 100 is ±0.5°.

Figure 11:
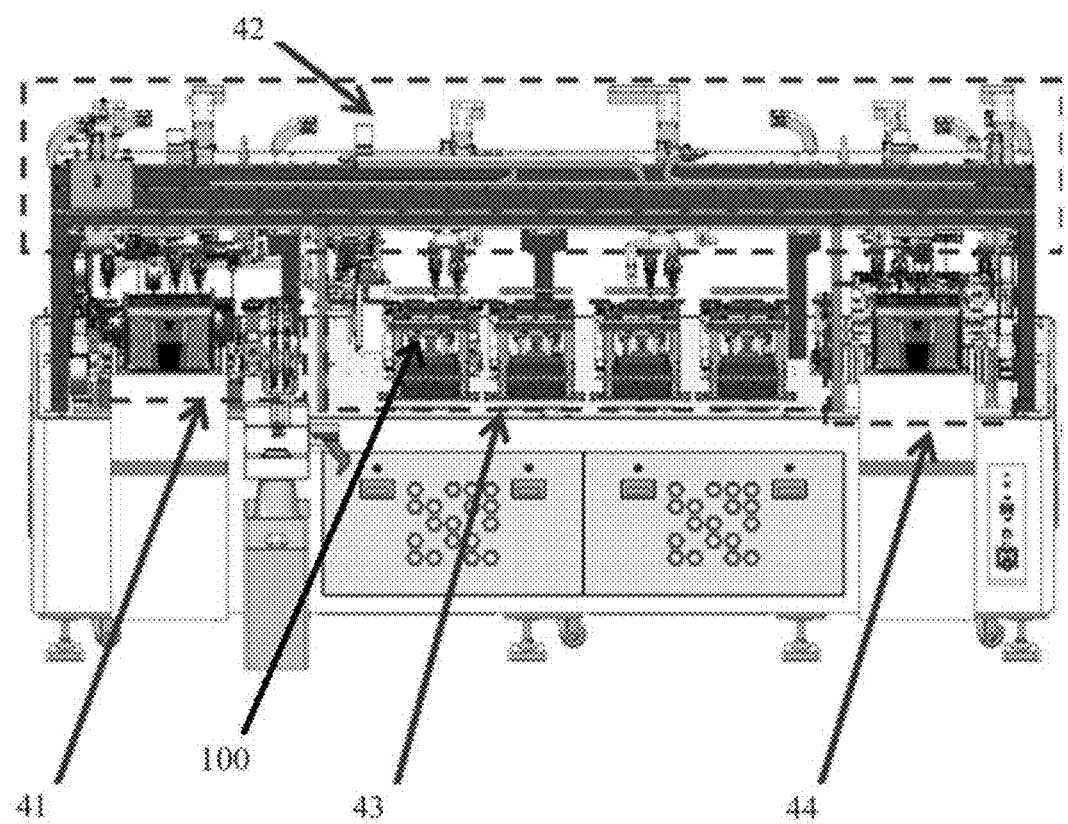
FIG. 11 illustrates a schematic diagram of a package testing machine provided by one embodiment of the present disclosure.

FIG. 11 illustrates a schematic diagram of a package testing machine. The package testing machine is configured for chip testing before and after chip packaging. The package testing machine includes a die automatic loading area 41, a die handling area 42, a die test area 43, and a die unloading area 44. The automatic die loading area 41 is configured for loading, positioning, stripping, and picking of dies. The die handling area 42 is configured for picking up and transporting dies between different test stations. The die test area 43 is configured for correcting die positions, controlling temperature, and testing different items. The die test area 43 can be set up with a plurality of stations to support multi-station parallel testing and serial testing, and different test projects. Referring to FIG. 7 and FIG. 11, in the die test area 43, a PCB board 15 in a chip testing device 100 contacts a first test probe 18, extends along an exterior of the chip testing device 100, and is connected to a package testing machine to transmit an electrical signal acquired by the first test probe 18 for testing a test chip 19. The die unloading area 44 is configured for conducting appearance inspections and packaging after a die test is completed, so that chips can be tested and classified into different chip boxes.

An automatic die loading apparatus configured to automatically pick up dies from a tape reel and adapt to dies of different sizes is arranged in the die automatic loading area 41. A structure of the automatic die loading apparatus can be referred to the any similar automatic die loading apparatus in existing technologies, which is not repeated herein.

In the die handling area 42, a high-speed linear motor is utilized to ensure die handling speed and stability. A nozzle transportation apparatus for chips contains six sets of nozzle mover handling structures, which operate in parallel without interfering with each other. Each set of nozzle mover handling structures consists of two suction nozzles and can suck two dies at a same time. Each group of suction nozzles can be positioned independently to facilitate quick switching between different products. A suction nozzle supports temperature control and can be preheated at high temperatures. The specially designed suction nozzle avoids contact with critical areas of dies and reduces a risk of crushing. A pressure of the suction nozzle to absorb dies is adjustable to prevent improper suction or crushing of die surfaces. The suction nozzle is arranged with a vacuum pressure sensor. By adjusting a vacuum pressure, an adsorption strength of the suction nozzle is ensured to prevent dies from falling during suction and transportation processes.

Figure 12:
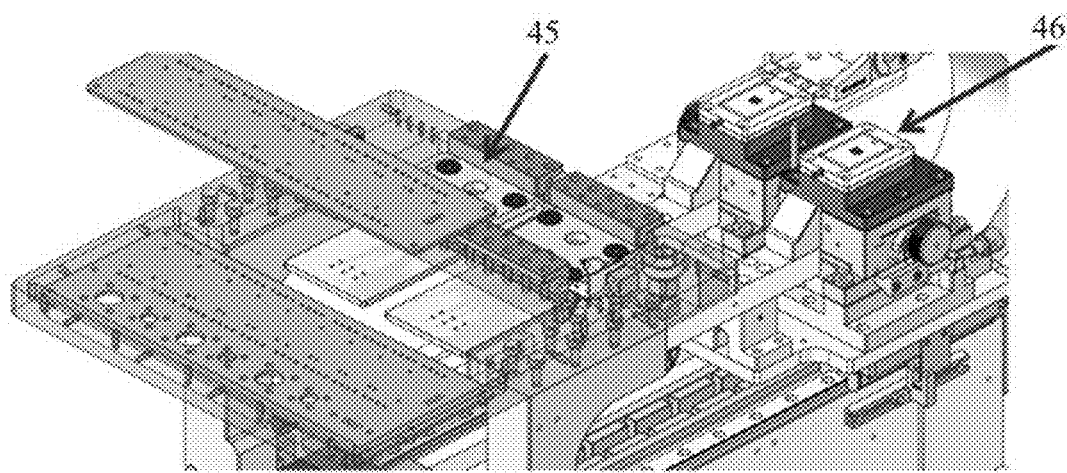
FIG. 12 illustrates a schematic diagram of a die test area in the package testing machine shown in FIG. 11.

FIG. 12 illustrates a schematic diagram of the die test area in the package testing machine shown in FIG. 11. In the die test area 43, two chips on the suction nozzle place materials (dies) to a calibration platform at a same time. The two chips perform position calibration at a same time, thereby reducing a calibration time. Two sets of upper sockets 45 are mounted on the PCB board 15, and each set of upper sockets 45 is switched and powered through a switch signal. A high-temperature nitrogen interface is reserved on each set of upper sockets 45. Two sets of lower sockets 46 are mounted on a test carrier, each reserving two sets of temperature control interfaces. The upper and lower sockets 46 are independent of each other, making position correction and maintenance more convenient. The lower sockets 46 are mounted on a high-speed linear motor and can switch rapidly between a loading position and a testing position. A CCD is arranged above a test site to visually identify whether a chip is correctly placed on the test site. The test site is equipped with a vacuum pressure detection system. By judging a pressure value of a suctioned die, whether the die is correctly placed on the site and whether there are any abnormalities such as warping can be determined, thereby ensuring that the die is correctly placed on the test site and preventing warping or flipping.

In the die unloading area 44, a conventional die unloading mechanism can be applied. An unloading station is equipped with a material (die) box in-situ detection system to prevent unloading failure or abnormalities caused by either an absence of a material box or an unsafe position of a material box. A large-field CCD is mounted at the unloading station, which allows real-time monitoring of an angle and a spacing of a die after the die is placed in the blue film to detect any abnormalities.

As disclosed, the chip testing device provided by the present disclosure at least realizes the following beneficial effects.

In the present disclosure, an upper base of the chip testing device is located above the lower base and is pressed against a lower base. A top of the lower base has a first mounting part for mounting a test chip and a second mounting part beneath the first mounting part. A first test probe penetrates the upper base and contacts the test chip to obtain an electrical signal of the test chip. A heat sink base is arranged at the second mounting part and contacts the test chip to transfer a received heat to the test chip. A first temperature sensor is in the heat sink base to measure the actual temperature of the test chip. The above technical solution inserts the first temperature sensor into the heat sink base to directly measure a temperature under the test chip, thereby ensuring a temperature consistency between the test chip and a temperature measurement point, precisely monitoring the actual temperature of the test chip and avoid any impact on an accuracy of a power-on performance test of the test chip.

Further, in the present disclosure, a thermal isolation base includes a fifth mounting part beneath a third mounting part. The chip testing device further includes a first elastic member arranged in the fifth mounting part. A top of the first elastic member contacts a second temperature sensor, so that the second temperature sensor contacts the heating component. The above technical solution incorporates an elastic member floating design beneath the heating component to ensure that once the heating component and the second temperature sensor are mounted, the heating component is in full contact with the second temperature sensor, ensuring a precise monitoring of an actual temperature of the heating component.

The package testing machine confirms that dies with good performance are used for packaging before high-density packaging, which improves a cumulative yield of packaging. The package testing machine can realize a fully automatic testing system and automatically realize picking, handling, testing, and unloading of dies. The package testing machine supports multi-station parallel testing, and each station supports different temperatures and test items. Different stations support static, dynamic, and avalanche functional tests, and a test sequence is adjustable. The package testing machine supports high-temperature testing with a temperature range from room temperature to 200° C. A power-on needle card features a sealed design, supports nitrogen-filled protection against high-pressure sparking and nitrogen pressure monitoring, and supports high-temperature preheating and die surface anti-oxidation protection.

A person skilled in the art should understand that, although exemplary embodiments of the present disclosure have been detailed herein, without departing from the spirit and scope of the present disclosure, numerous other variations, or modifications consistent with principles of the disclosure are directly determined or deduced from the content of the present disclosure. Therefore, the scope of the present disclosure should be understood and deemed to cover all such variations or modifications.

What is claimed is:

1. A chip testing device, comprising:
    an upper base and a lower base, the upper base being above the lower base and being pressed against the lower base, and a top of the lower base featuring a first mounting part for mounting a test chip and a second mounting part beneath the first mounting part;
    a first test probe, penetrating the upper base and contacts the test chip to obtain an electrical signal of the test chip;
    a heat sink base, at the second mounting part and contacting the test chip to transfer a received heat to the test chip;
    a first temperature sensor in the heat sink base to measure an actual temperature of the test chip;
    a thermal isolation base below the lower base and in contact with the lower base, a third mounting part being on top of the thermal isolation base; and
    a heating component at the third mounting part and beneath the heat sink base to heat the heat sink base.

2. The chip testing device according to claim 1, wherein the lower base further includes a fourth mounting part beneath the second mounting part, and the chip testing device further includes:
    a conductive sheet at the fourth mounting part, a top of the conductive sheet contacting the heat sink base, and a bottom of the conductive sheet contacting the heating component to transfer a heat generated by the heating component to the heat sink base.

3. The chip testing device according to claim 2, wherein the thermal isolation base includes a fourth mounting part beneath the third mounting part, and the chip testing device further includes:
    a second elastic member, arranged in the fourth mounting part, and a top of the second elastic member contacts a bottom of the heating component.

4. The chip testing device according to claim 2, wherein a fifth mounting part is arranged inside the heat sink base, and the fifth mounting part is configured to mount an adsorption component to adsorb the test chip.

5. The chip testing device according to claim 1, wherein the conductive sheet includes a body and an extension part extending upward from the body to reach above the lower base, and the chip testing device further includes:
    a second test probe penetrating the upper base and contacting the extension part to obtain an electrical signal of the test chip.

6. The chip testing device according to claim 5, wherein the thermal isolation base includes a fourth mounting part beneath the third mounting part, and the chip testing device further includes:
    a second elastic member, arranged in the fourth mounting part, and a top of the second elastic member contacts a bottom of the heating component.

7. The chip testing device according to claim 1, wherein the heating component is a ceramic heating plate.

8. The chip testing device according to claim 7, wherein the thermal isolation base includes a fourth mounting part beneath the third mounting part, and the chip testing device further includes:
    a second elastic member, arranged in the fourth mounting part, and a top of the second elastic member contacts a bottom of the heating component.

9. The chip testing device according to claim 1, further comprising a second temperature sensor arranged at the heating component to measure a temperature of the heating component.

10. The chip testing device according to claim 9, wherein the second temperature sensor is arranged at a bottom of the heating component and contacts the heating component.

11. The chip testing device according to claim 10, wherein the thermal isolation base includes a fourth mounting part beneath the third mounting part, and the chip testing device further includes:
    a first elastic member in the fourth mounting part, a top of the first elastic member being contacts the second temperature sensor, so that the second temperature sensor contacts the heating component.

12. The chip testing device according to claim 11, wherein the thermal isolation base includes a fifth mounting part beneath the third mounting part, and the chip testing device further includes:
   a second elastic member, arranged in the fifth mounting part, and a top of the second elastic member contacts a bottom of the heating component.

13. The chip testing device according to claim 10, wherein the thermal isolation base includes a fourth mounting part beneath the third mounting part, and the chip testing device further includes:
   a second elastic member, arranged in the fourth mounting part, and a top of the second elastic member contacts a bottom of the heating component.

14. The chip testing device according to claim 9, wherein the thermal isolation base includes a fourth mounting part beneath the third mounting part, and the chip testing device further includes:
   a second elastic member, arranged in the fourth mounting part, and a top of the second elastic member contacts a bottom of the heating component.

15. The chip testing device according to claim 1, wherein the thermal isolation base includes a fourth mounting part beneath the third mounting part, and the chip testing device further includes:
   a second elastic member, arranged in the fourth mounting part, and a top of the second elastic member contacts a bottom of the heating component.

16. The chip testing device according to claim 1, wherein a fourth mounting part is arranged inside the heat sink base, and the fourth mounting part is configured to mount an adsorption component to adsorb the test chip.

17. A package testing machine, comprising:
   a die loading apparatus, for automatically picking up dies from a tape reel and adapting to dies of different sizes in a die automatic loading area;
   a high-speed linear motor, for ensuring die handling speed and stability and a nozzle transportation apparatus for chips, containing six sets of nozzle mover handling structures in a die handling area;
   an unloading station, equipped with a material (die) box in-situ detection system to prevent unloading failure or abnormalities and a large-field CCD, mounted at the unloading station in a die unloading area; and
   a chip testing device, for ensuring accuracy of a power-on performance test by precisely monitoring an actual temperature of a test chip, and a plurality of stations, for supporting multi-station parallel testing and serial testing, and different test projects in a die test area, wherein the chip device includes:
      an upper base and a lower base, the upper base being above the lower base and being pressed against the lower base, and a top of the lower base featuring a first mounting part for mounting the test chip and a second mounting part beneath the first mounting part,
      a first test probe, penetrating the upper base and contacts the test chip to obtain an electrical signal of the test chip,
      a heat sink base, at the second mounting part and contacting the test chip to transfer a received heat to the test chip, and
      a first temperature sensor in the heat sink base to measure an actual temperature of the test chip.

18. The package testing machine according to claim 17, wherein:
   a PCB board in the chip testing device contacts a first test probe, extends along an exterior of the chip testing device, and is connected to a package testing machine to transmit an electrical signal acquired by the first test probe for testing a test chip;
   two sets of upper sockets are mounted on the PCB board, and each set of upper sockets is switched and powered through a switch signal;
   two sets of lower sockets are mounted on a test carrier in the die test area, each reserving two sets of temperature control interfaces; and
   the upper are independent of the lower sockets.

* * * * *